United States Patent [19]

Hoffman

[11] Patent Number: 4,918,968
[45] Date of Patent: Apr. 24, 1990

[54] APPARATUS AND METHOD OF DETECTING LEAKS IN PRESSURIZED PIPING SYSTEMS

[76] Inventor: Kenneth L. Hoffman, 2515 West Anna, Grand Island, Nebr. 68801

[21] Appl. No.: 377,879

[22] Filed: Jul. 10, 1989

[51] Int. Cl.$^5$ ............................................. G01M 3/26
[52] U.S. Cl. .................... 73/40; 73/40.5 R; 73/37
[58] Field of Search ............... 73/37, 40, 40.5 R, 49.1, 73/49.5

[56] References Cited

U.S. PATENT DOCUMENTS

| | | | |
|---|---|---|---|
| 2,343,792 | 3/1944 | Overbeck et al. | 73/111 |
| 3,034,357 | 5/1962 | Brown | 73/407 |
| 3,375,720 | 4/1968 | Whiting | 73/419 |
| 3,438,247 | 5/1969 | Lotti et al. | 73/40 |
| 3,678,754 | 7/1972 | Amir et al. | 73/419 |
| 4,199,992 | 4/1980 | Myles | 73/744 |
| 4,375,162 | 3/1983 | Eppley | 73/37 |

Primary Examiner—Hezron E. Williams
Attorney, Agent, or Firm—Henderson & Sturm

[57] ABSTRACT

A leak detector including a fill cylinder and a pressure cylinder mounted in spaced relationship on a frame. The fill cylinder includes a movable liquid-tight piston, valved ports on one side of the piston, and a vent port on the opposite side. The pressure cylinder includes a movable pressure piston, a pressure regulator in communication with one side of the piston, and an access port on the opposite side. A connecting rod interconnects the liquid-tight piston and the pressure piston and spans the space between the cylinders. A pointer attached to the connecting rod registers with a calibrated scale on the frame and movement of the pointer toward the fill cylinder indicates a leak in the pressurized liquid piping system being tested.

12 Claims, 4 Drawing Sheets

APPARATUS AND METHOD OF DETECTING LEAKS IN PRESSURIZED PIPING SYSTEMS

TECHNICAL FIELD

This invention relates to fluid piping systems, and more particularly to an apparatus and method of detecting leaks in a pressurized piping system for liquid petroleum products.

BACKGROUND ART

Known devices used for testing for leaks in pressurized piping systems are complex and costly. With the advent of regulations requiring periodic monitoring of piping systems for petroleum products, the need for a simple, reliable and inexpensive leak detector is apparent. Pressurized piping systems must include devices to automatically shut off or restrict flow, or have an alarm that indicates a leak. Also, either an annual tightness test of the piping must be conducted or monthly vapor monitoring, ground-water monitoring, or interstitial monitoring must be undertaken.

Those concerned with these and other problems recognize the need for an improved apparatus and method for detecting leaks in a pressurized liquid piping system.

DISCLOSURE OF THE INVENTION

The present invention provides a leak detector including a fill cylinder and a pressure cylinder mounted in spaced relationship on a frame. The fill cylinder includes a movable liquid-tight piston, valved ports on one side of the piston, and a vent port on the opposite side. The pressure cylinder includes a movable pressure piston, a pressure regulator in communication with one side of the piston, and an access port on the opposite side. A connecting rod interconnects the liquid-tight piston and the pressure piston and spans the space between the cylinders. A pointer attached to the connecting rod registers with a calibrated scale on the frame and movement of the pointer toward the fill cylinder indicates a leak in the pressurized liquid piping system being tested.

An object of the present invention is the provision of an improved apparatus and method for detecting leaks in a pressurized liquid piping system.

Another object is to provide a leak detector that is easy and convenient to use.

A further object of the invention is the provision of a leak detector that can be used for a wide range of working pressures.

Still another object is to provide a leak detector capable of indicating losses at a constant pressure.

A still further object of the present invention is the provision of a leak detector that is capable of indicating trapped air in a piping system as well as liquid product loss.

Yet another object is the provision of a leak detector that is inexpensive and easy to maintain.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
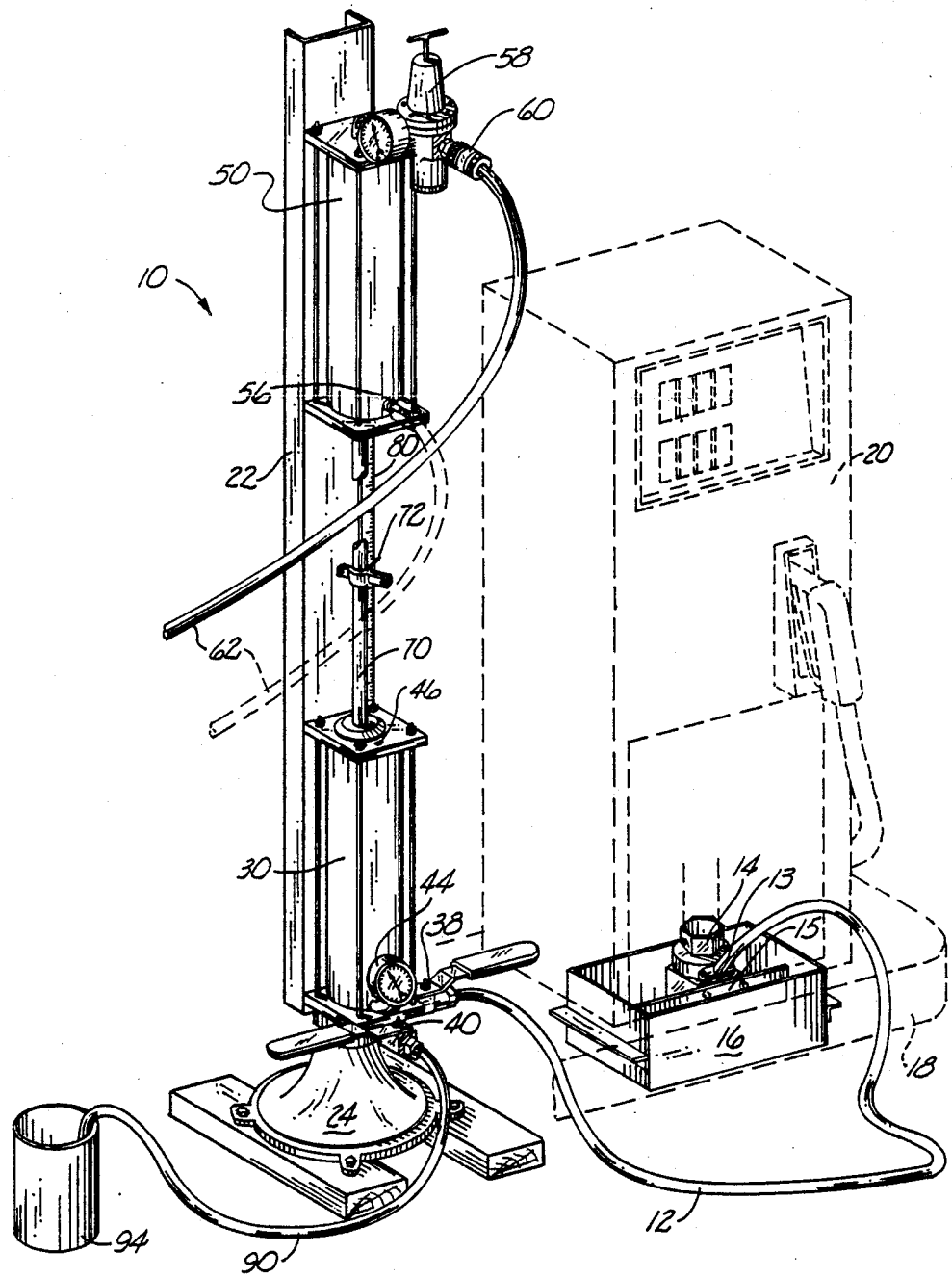
FIG. 1 is a perspective view of the leak detector of the present invention attached to a pressurized liquid petroleum product line.

Referring now to the drawings, wherein like reference numerals designate identical or corresponding parts throughout the several views, FIG. 1 shows the leak detector (10) of the present invention operably attached by a high pressure hose (12) to the test port (13) of an emergency valve (14) which forms a part of a pressurized liquid petroleum product piping system to be tested. The emergency valve (14) is mounted on a bracket (15) in the pump box or base (16) positioned in a poured concrete island (18) for supporting a conventional liquid petroleum product dispenser (20).

The leak detector (10) includes a vertically disposed elongated mounting frame (22) attached to a base member (24). It is to be understood that the frame (22) could be horizontally disposed without affecting the operation of the apparatus if the user preferred to work with that general arrangement. The frame (22) supports a fill cylinder (30) and a coaxially aligned pressure cylinder (50).

Figure 2:
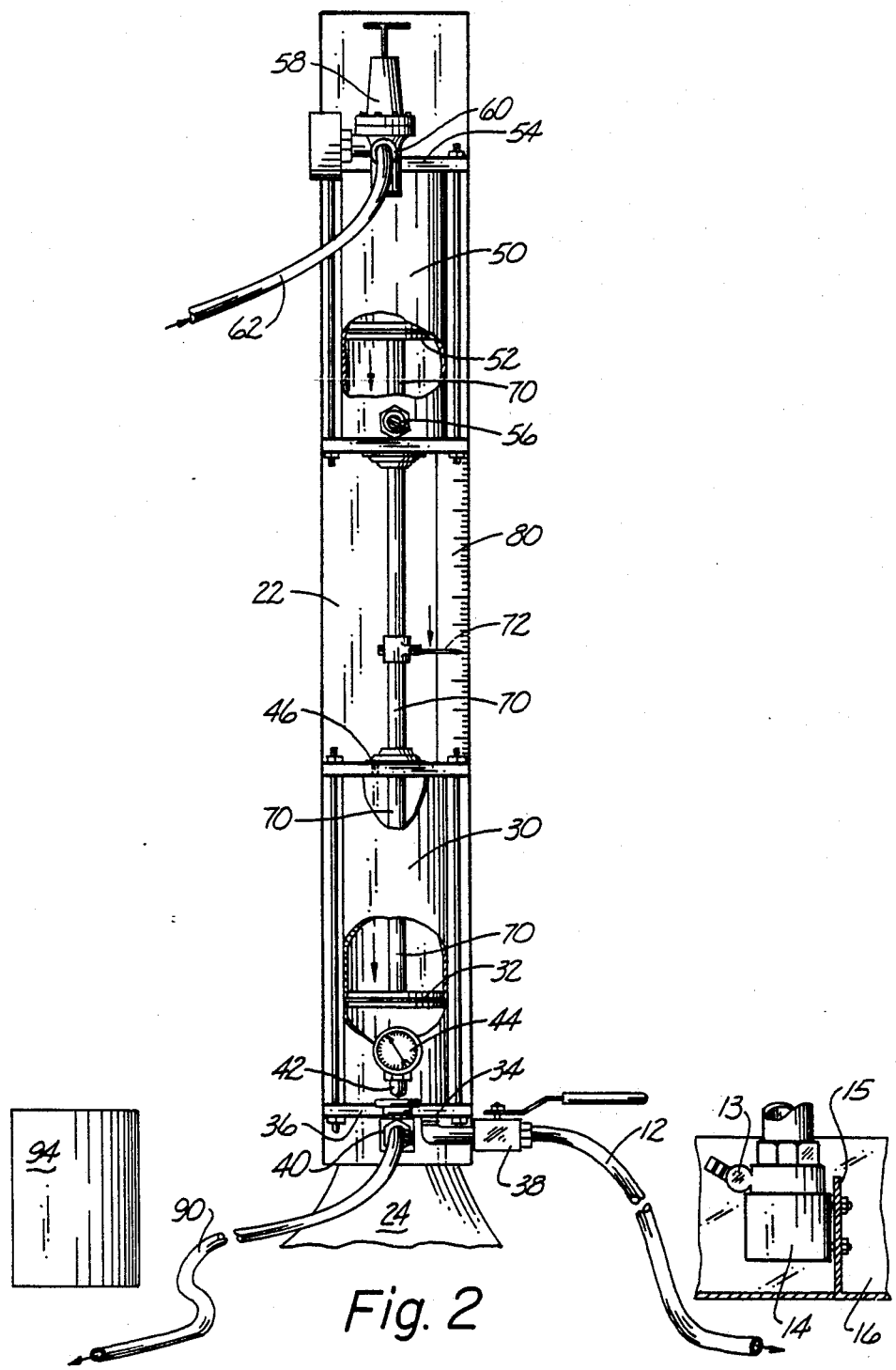
FIG. 2 is a front elevational view of the leak detector with portions cut away to show internal components, wherein air pressure is being applied through the pressure regulator on the pressure cylinder to push the pistons to the bottoms of their respective cylinders.
Figure 3:
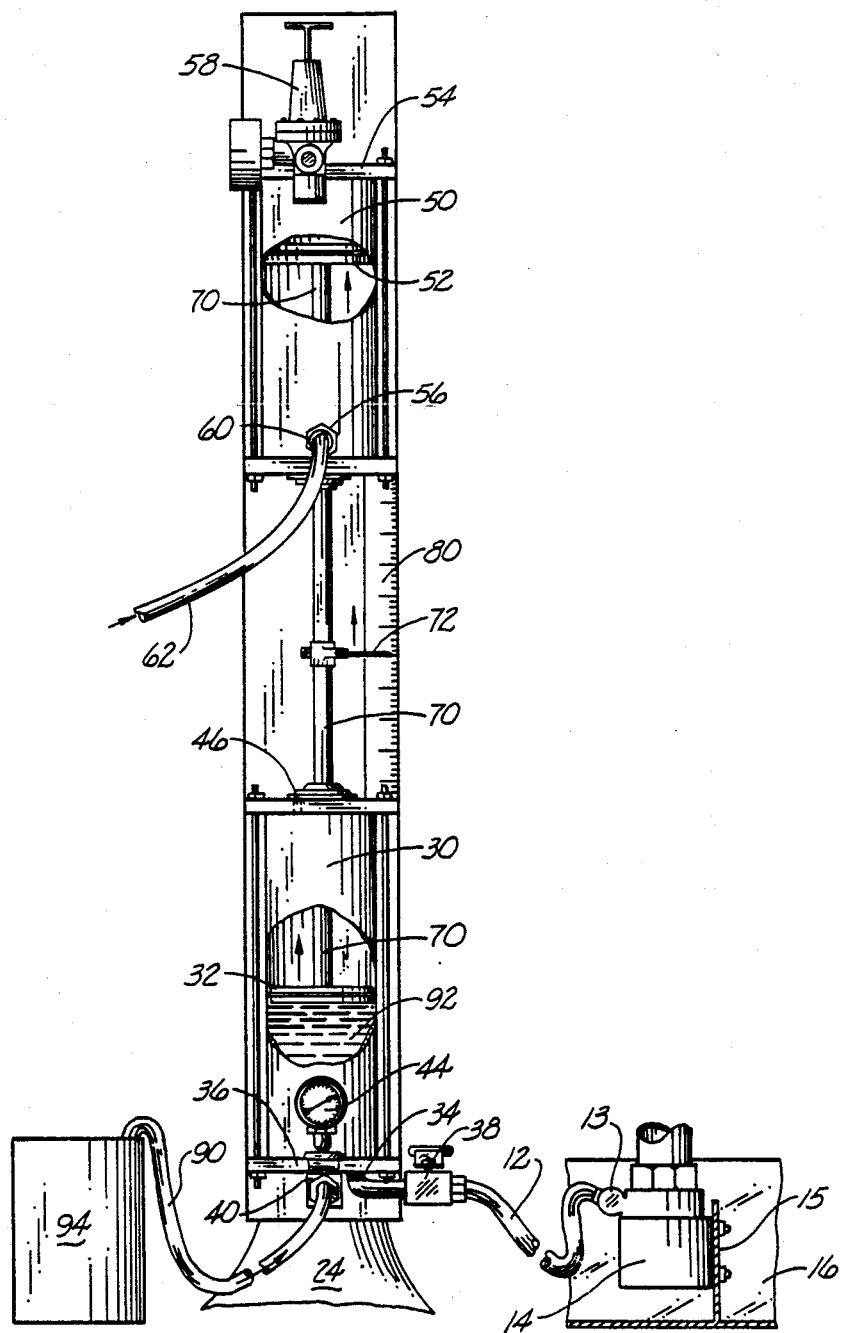
FIG. 3 is a front elevational view similar to FIG. 2 wherein air pressure is being applied through the access port on the pressure cylinder to raise the pistons and draw a supply of liquid petroleum product into the fill cylinder.
Figure 4:
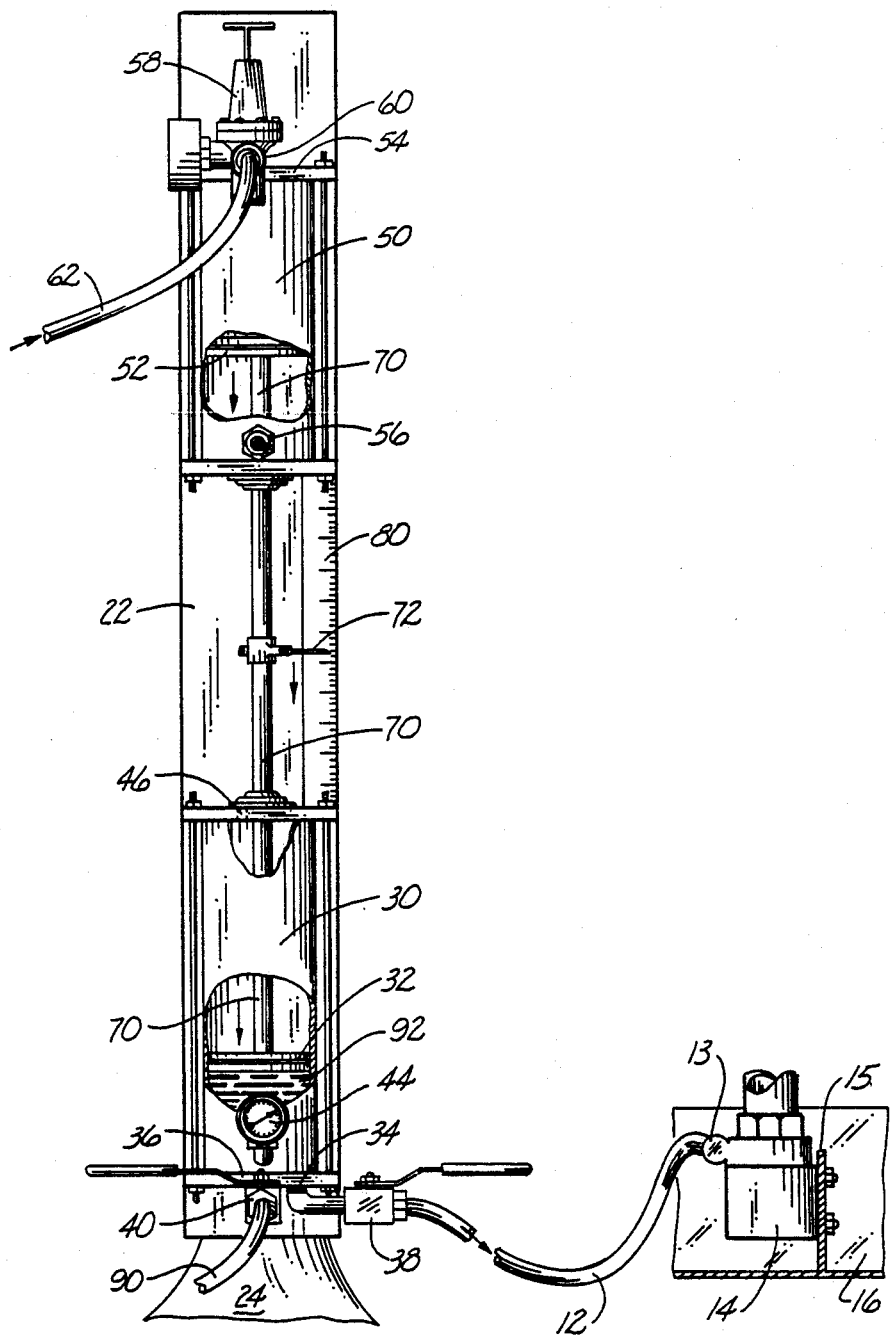
FIG. 4 is a front elevational view similar to FIGS. 2 and 3, where a predetermined air pressure is being applied through the pressure regulator and transmitted to the supply of liquid product in the fill cylinder which is in open fluid communication with the pressurized liquid piping system being tested.

As most clearly shown in FIGS. 2–4, the fill cylinder (30) includes a movable liquid-tight piston (32). A test line port (34) and a liquid product suction port (36) are formed in the fill cylinder (30) on one side of the liquid-tight piston (32) and these ports (34, 36) are selectively closable by valves (38, 40). Also, a pressure gauge port (42) is formed in the fill cylinder (30) near the end and accommodates a liquid pressure gauge (44). A weep or vent port (46) is formed in the opposite end of the fill cylinder (30).

The pressure cylinder (50) includes a movable pressure piston (52), a pressure regulator port (54) formed in the cylinder (50) on one side of the piston (52), and an access port (56) formed in the cylinder (50) on the opposite side of the piston (52). A pressure regulator (58) is attached to the port (54) and is connected by quick coupler (60) to a conventional pressurized air supply line (62).

A connecting rod (70) is attached to and interconnects the liquid-tight piston (32) and the pressure piston (52). The rod (70) is disposed to span the space between the fill cylinder (30) and the pressure cylinder (50). A pointer (72) is adjustably attached to the rod (70) and registers with the calibrated scale (80) on the frame (22).

The method of testing for leaks using the leak detector (10) is best described by reference to the sequence of operations illustrated by FIGS. 2–4. FIG. 2 shows air pressure being applied through the pressure regulator (58) to move the pistons (32, 52) to the bottom of their respective cylinders (30, 50). FIG. 3 illustrates the hose (90) connecting the port (36) to the supply of liquid petroleum product (92) in the container (94) with valve (40) open, the high pressure hose (12) connected to the test port (13) with valve (38) closed, and application of air pressure through access port (56) to move the pistons (32, 52) up to draw liquid product (92) into the fill cylinder (30). FIG. 4 shows valve (40) closed, valve (38) open, and the application of a predetermined pressure through the pressure regulator (58) as indicated on gauge (44). Movement of the pointer (72) toward the fill cylinder (30) indicates leakage of liquid product from the pressurized piping system being tested.

Upon release of the predetermined pressure, movement of the pointer (72) toward the pressure cylinder (50) indicates the presence of trapped air in the liquid piping system being tested.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. An apparatus for detecting leaks in a pressurized liquid piping system comprising:
   a mounting frame;
   a fill cylinder attached to said frame, said fill cylinder including a movable liquid-tight piston disposed therein and being movable between opposite ends of said fill cylinder;
   a selectively closable test line port, and a selectively closable liquid product suction port formed in said fill cylinder on one side of said liquid-tight piston, and a vent port formed in said fill cylinder on the opposite side of said liquid-tight piston;
   means for connecting said test line port to a pressurized liquid piping system to be tested;
   means for connecting said liquid product suction port to a supply of liquid product;
   means for determining the pressure of liquid product in the fill cylinder on one side of said liquid-tight piston;
   a pressure cylinder attached to said frame and being spaced from and coaxially aligned with said fill cylinder, said pressure cylinder including a movable pressure piston disposed therein and being movable between opposite ends of said pressure cylinder;
   a pressure regulator port formed in said pressure cylinder on one side of said pressure piston, and an access port formed in said pressure cylinder on the opposite side of said pressure piston;
   a connecting rod attached to and interconnecting said liquid-tight piston and said pressure piston, said rod being disposed to span the space between the fill cylinder and the pressure cylinder;
   means for applying a predetermined pressure to one side of the pressure piston through said pressure regulator port;
   means for applying pressure to the opposite side of the pressure piston through said access port; and
   means for indicating the position of said connecting rod relative to the frame in the space between the fill cylinder and the pressure cylinder, whereby movement of the rod toward the fill cylinder indicates a leak in the pressurized liquid piping system being tested.

2. The apparatus of claim 1 wherein said test line port is in fluid communication with a closable test line valve.

3. The apparatus of claim 1 wherein said liquid products suction port is in fluid communication with a closable liquid product suction valve.

4. The apparatus of claim 1 wherein said test line connecting means is a high pressure hose.

5. The apparatus of claim 1 wherein said liquid product connecting means is a hose.

6. The apparatus of claim 1 wherein said liquid pressure determining means is a liquid pressure gauge.

7. The apparatus of claim 1 further including a quick connect pneumatic coupling attached to said access port.

8. The apparatus of claim 1 wherein said means for applying a predetermined pressure to said one side of the pressure piston is an air supply coupled to a pressure regulator attached to and in fluid communication with said pressure regulator port.

9. The apparatus of claim 1 wherein said means for applying pressure to the opposite side of the pressure piston is an air supply coupled to said access port.

10. The apparatus of claim 1 wherein said rod position indicating means includes a pointer attached to and extending from said connecting rod and a calibrated scale on said frame in the space between the fill cylinder and the pressure cylinder.

11. A method of detecting leaks in a pressurized liquid piping system using an apparatus including a mounting frame; a fill cylinder attached to said frame, said fill cylinder including a movable liquid-tight piston disposed therein and being movable between opposite ends of said fill cylinder; a selectively closable test line port, and a selectively closable liquid product suction port formed in said fill cylinder on one side of said liquid-tight piston, and a vent port formed in said fill cylinder on the opposite side of said liquid-tight piston; means for connecting said test line port to a pressurized liquid piping system to be tested; means for connecting said liquid product suction port to a supply of liquid product; means for determining the pressure of liquid product in the fill cylinder on one side of said liquid-tight piston; a pressure cylinder attached to said frame and being spaced from and coaxially aligned with said fill cylinder, said pressure cylinder including a movable pressure piston disposed therein and being movable between opposite ends of said pressure cylinder; a pressure regulator port formed in said pressure cylinder on one side of said pressure piston, and an access port formed in said pressure cylinder on the opposite side of said pressure piston; a connecting rod attached to and interconnecting said liquid-tight piston and said pressure piston, said rod being disposed to span the space between the fill cylinder and the pressure cylinder; means for applying a predetermined pressure to one side of the pressure piston through said pressure regulator port; means for applying pressure to the opposite side of the pressure piston through said access port; and means for indicating the position of said connecting rod relative to the frame in the space between the fill cylinder and the pressure cylinder, whereby movement of the rod toward the fill cylinder indicates a leak in the pressurized liquid piping system being tested, said method comprising the steps of:

applying air pressure through said pressure regulator port to move the pressure piston and the interconnected liquid-tight piston to one end of their respective pressure cylinder and fill cylinder;

closing the test line port;

opening the liquid product suction port;

connecting said liquid product suction port to a supply of liquid product;

connecting said test line port to a pressurized liquid piping system to be tested;

applying air pressure through the access port to move the pressure piston and the interconnected liquid-tight piston to draw liquid product into the fill cylinder through the liquid product suction port;

closing the liquid product suction port;

opening the test line port;

applying a predetermined pressure to one side of the pressure piston through the pressure regulator port until the predetermined pressure is indicated on the liquid pressure determining means;

monitoring the location of the rod position indicating means, wherein movement of the indicating means toward the fill cylinder indicates leakage of liquid product from the liquid piping system being tested at the constant predetermined pressure.

12. The method of claim 11 further including the steps of:

releasing the predetermined pressure on one side of the pressure piston; and monitoring the location of the rod position indicating means, wherein movement of the indicating means toward the pressure cylinder indicates the presence of trapped air in the liquid piping system being tested.

* * * * *